US007376116B2

(12) United States Patent
Rozenblit et al.

(10) Patent No.: US 7,376,116 B2
(45) Date of Patent: May 20, 2008

(54) SOFTWARE DEFINED MULTIPLE TRANSMIT ARCHITECTURE

(75) Inventors: Dmitriy Rozenblit, Irvine, CA (US); William J. Domino, Yorba Linda, CA (US); Morten Damgaard, Laguna Hills, CA (US); Rahul Magoon, Irvine, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 198 days.

(21) Appl. No.: 10/357,125

(22) Filed: Feb. 3, 2003

(65) Prior Publication Data

US 2004/0151140 A1   Aug. 5, 2004

(51) Int. Cl.
*H04B 7/216* (2006.01)
(52) U.S. Cl. .................. 370/342; 370/441; 455/552.1; 455/553.1
(58) Field of Classification Search ................ 370/311, 370/328, 342, 345, 441, 442
See application file for complete search history.

(56) References Cited

U.S. PATENT DOCUMENTS

| | | | | |
|---|---|---|---|---|
| 5,533,099 | A * | 7/1996 | Byrne ..................... | 455/552.1 |
| 5,640,386 | A * | 6/1997 | Wiedeman ................. | 370/320 |
| 5,663,957 | A * | 9/1997 | Dent ......................... | 370/347 |
| 5,754,542 | A * | 5/1998 | Ault et al. ................. | 370/342 |
| 6,484,038 | B1 * | 11/2002 | Gore et al. .............. | 455/552.1 |
| 6,594,505 | B1 * | 7/2003 | Ishii ......................... | 455/552.1 |
| 6,957,081 | B2 * | 10/2005 | Leyh et al. .............. | 455/553.1 |
| 6,987,986 | B2 * | 1/2006 | Boesen .................... | 455/556.1 |
| 2001/0000456 | A1 * | 4/2001 | McGowan ................. | 370/342 |
| 2001/0031645 | A1 * | 10/2001 | Jarrett ........................ | 455/552 |

(Continued)

FOREIGN PATENT DOCUMENTS

| EP | 1052863 A2 * | 11/2000 |
|---|---|---|
| EP | 1162754 A2 * | 12/2001 |

OTHER PUBLICATIONS

Nikfeld, G. et al., "Mobile Multi-Modal Data Services for GPRS Phones and Beyond," Fourth IEEE International Conference on Multimodal Interfaces, Oct. 14-16, 2002. pp. 337-342.*

(Continued)

*Primary Examiner*—Chi Pham
*Assistant Examiner*—Donald L Mills (57) ABSTRACT

A software defined transmit architecture includes a plurality of individually selectable components that can be selectively enabled to transmit a data signal that complies with any of a plurality of transmission standards. The software defined transmit architecture comprises components that can be enabled by associated logic to transmit, for example, communications signals that comply with the global system for mobile communications (GSM), enhanced data rates for GSM evolution (EDGE), which employs TDMA, and wide band code division multiple access (WCDMA) transmission standards. A single transmit architecture supports multiple transmission standards, thus minimizing the number of components in a multi-band, multi-mode portable transceiver, while reducing the number of active components.

18 Claims, 6 Drawing Sheets

U.S. PATENT DOCUMENTS

2001/0055980 A1* 12/2001 Sato ........................ 455/552
2002/0059434 A1* 5/2002 Karaoguz et al. ........... 709/228
2002/0102987 A1* 8/2002 Souisse et al. .............. 455/454

OTHER PUBLICATIONS

Minnis, B.J. et al., "A Highly Digitized Multimode Receiver Architecture for 3G Mobiles," IEEE Transactions on Vehicular Technology, May 2003. vol. 3, iss. 3, pp. 637-653.*

U.S. Utility Patent Application entitled "Mirror Translation Loop Transmitter Architecture", filed Jul. 29, 2002, and assigned U.S. Appl. No. 10/207,320.

U.S. Utility Patent Application entitled "Wireless Transmitter Incorporating a Synchronous Oscillator in a Translation Loop", filed Aug. 30, 2002, and assigned U.S. Appl. No. 10/233,231.

* cited by examiner

FIG. 3
GSM

FIG. 4
EDGE/TDMA

FIG. 5
WCDMA

FIG. 6

SOFTWARE DEFINED MULTIPLE TRANSMIT ARCHITECTURE

BACKGROUND OF THE INVENTION

1. Field of the Invention

This invention relates generally to transmit circuit architecture in a wireless portable communication device. More particularly, the invention relates to a software defined multiple transmit architecture for a wireless transmitter that is capable of communicating using multiple transmit methodologies.

2. Related Art

With the increasing availability of efficient, low cost electronic modules, mobile communication systems are becoming more and more widespread. For example, there are many variations of communication schemes in which various frequencies, transmission schemes, modulation techniques and communication protocols are used to provide two-way voice and data communications in a handheld, telephone-like communication handset. The different modulation and transmission schemes each have advantages and disadvantages.

As these mobile communication systems have been developed and deployed, many different standards, to which these systems must conform, have evolved. For example, in the United States, third generation portable communications systems comply with the IS-136 standard, which requires the use of a particular modulation scheme and access format. In the case of IS-136, the modulation scheme can be 8-quadrature phase shift keying (8QPSK), offset $\pi/4$ differential quadrature phase shift keying ($\pi/4$-DQPSK) or variations thereof and the access format is TDMA.

In Europe, the global system for mobile communications (GSM) standard requires the use of the gaussian minimum shift keying (GMSK) modulation scheme in a narrow band TDMA access environment, which uses a constant envelope modulation methodology.

Furthermore, in a typical GSM mobile communication system using narrow band TDMA technology, a GMSK modulation scheme supplies a very low noise phase modulated (PM) transmit signal to a non-linear power amplifier directly from an oscillator. In such an arrangement, a non-linear power amplifier, which is highly efficient, can be used thus allowing efficient modulation of the phase-modulated signal and minimizing power consumption. Because the modulated signal is supplied directly from an oscillator, the need for filtering, either before or after the power amplifier, is minimized. Further, the output in a GSM transceiver is a constant envelope (i.e., a non time-varying signal containing only a phase modulated (PM) signal) modulation signal.

Many non-constant envelope transmit architectures use a modulation scheme where both a PM signal and an amplitude modulated (AM) signal are transmitted. Standards employing these schemes increase the data rate without increasing the bandwidth of the transmitted signal. Unfortunately, even though it would be desirable to have one portable transceiver that can accommodate all of the above-mentioned transmission schemes, existing GSM modulation schemes are not easily adapted to transmit a signal that includes both a PM component and an AM component. One reason for this difficulty is that in order to transmit a distortion free signal containing a PM component and an AM component, a highly linear power amplifier is required. Unfortunately, highly linear power amplifiers are very inefficient, thus consuming significantly more power than a non-linear power amplifier and drastically reducing the life of the battery or other power source.

In non-constant envelope modulation, an amplitude modulated (AM) portion of the signal causes the transmit output signal to vary in amplitude. In constant envelope modulation, the transmit output signal is always at a constant amplitude. Emerging communication standards, such as enhanced data rates for GSM evolution (EDGE), which is an extension to the global system for mobile, communications (GSM) and wide band code division multiple access (WCDMA) will likely use a non-constant envelope modulation scheme. As the transmit architectures for these new standards are under development, it is generally desirable to have a single transmit architecture that supports as many standards as possible.

One possible manner of developing a single transmit architecture that is capable of both constant envelope and non-constant envelope modulation use a conventional upconverter with filters inserted into the transmit chain. Such an architecture requires filters at the intermediate frequency (IF), at the radio frequency (RF) before the power amplifier and at RF after the power amplifier. Unfortunately, a multi-standard transmit architecture would require many filters to be switched in and out of the transmit circuit, or would require separate transmit chains.

Further, when a new wireless communication system standard emerges, it is desirable to have a transmit architecture that can satisfy the new standard and still remain "backwards compatible" with existing standards. Often the new standard is designed using principles and techniques that are fundamentally at odds with one another. For example, an existing standard may us TDMA, narrow signal bandwidth, constant-envelope modulation (i.e., GSM), while a new standard may use code access (CDMA), wide signal bandwidth, non-constant envelope modulation (i.e., wideband CDMA (WCDMA)). Further, the two systems may operate in different frequency bands. Such differences in transmission standards cause a "ripple effect" throughout the system design process and will typically result in very different transmit architectures (i.e., different filtering, different power amplification, etc.). Yet, it is desirable to have a single transmit architecture that can satisfy multiple standards.

Existing transmit architectures for wireless digital standards are not sufficiently flexible to support alternative standards without significant modifications of the transmit hardware. As a result, existing multiple standard (also referred to as "multi-band" or "multi-mode") transmit architectures require a significant number of components including both active and passive devices. This can require that a single portable communication device include two separate transmitters, resulting in a costly and excessively bulky device. Further, when operating in communication standards that require non-constant envelope modulation (i.e., standards that include an AM component), power efficiency is reduced, resulting in shortened battery life and increased heat dissipation from the active components. An example of such a situation is the universal mobile telephone service (UMTS) standard, which requires a portable communication device to operate in both GSM mode and WCDMA mode.

With the increasing desirability of developing one worldwide portable communication standard, it would be desirable to have a portable transceiver that can operate in multiple digital standards, while minimizing the number of components in the transmit architecture.

SUMMARY

Embodiments of the invention include a software defined multiple transmit architecture that is capable of operating using multiple transmit standards. A software defined transmit architecture includes a plurality of individually selectable components that can be selectively enabled to transmit a data signal that complies with any of a plurality of transmission standards. The software defined transmit architecture comprises components that can be enabled by associated logic to transmit, for example, communications signals that comply with the global system for mobile communications (GSM), enhanced data rates for GSM evolution (EDGE), which employs TDMA, and wide band code division multiple access (WCDMA) transmission standards. A single transmit architecture supports multiple transmission standards, thus minimizing the number of components in a multi-band, multi-mode portable transceiver, while reducing the number of active components.

Related methods of operation and computer readable media are also provided. Other systems, methods, features, and advantages of the invention will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE FIGURES

The invention can be better understood with reference to the following figures. The components within the figures are not necessarily to scale, emphasis instead being placed upon clearly illustrating the principles of the invention. Moreover, in the figures, like reference numerals designate corresponding parts throughout the different views.

DETAILED DESCRIPTION

Although described with particular reference to a portable transceiver, the software defined multiple transmit architecture can be implemented in any communication device in which multiple standard operation is desired. Furthermore, the software defined multiple transmit architecture is applicable to any transmitter in which constant-envelope and non-constant envelope modulation is used.

The software defined multiple transmit architecture can be implemented using a combination of software and hardware. The hardware portion of the invention can be implemented using specialized hardware elements and logic. The software portion can be stored in a memory and be executed by a suitable instruction execution system (microprocessor). The hardware implementation of the software defined multiple transmit architecture can include any or a combination of the following technologies, which are all well known in the art: a discrete logic circuit(s) having logic gates for implementing logic functions upon data signals, an application specific integrated circuit having appropriate logic gates, a programmable gate array(s) (PGA), a field programmable gate array (FPGA), etc.

The software for the software defined multiple transmit architecture comprises an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 1:
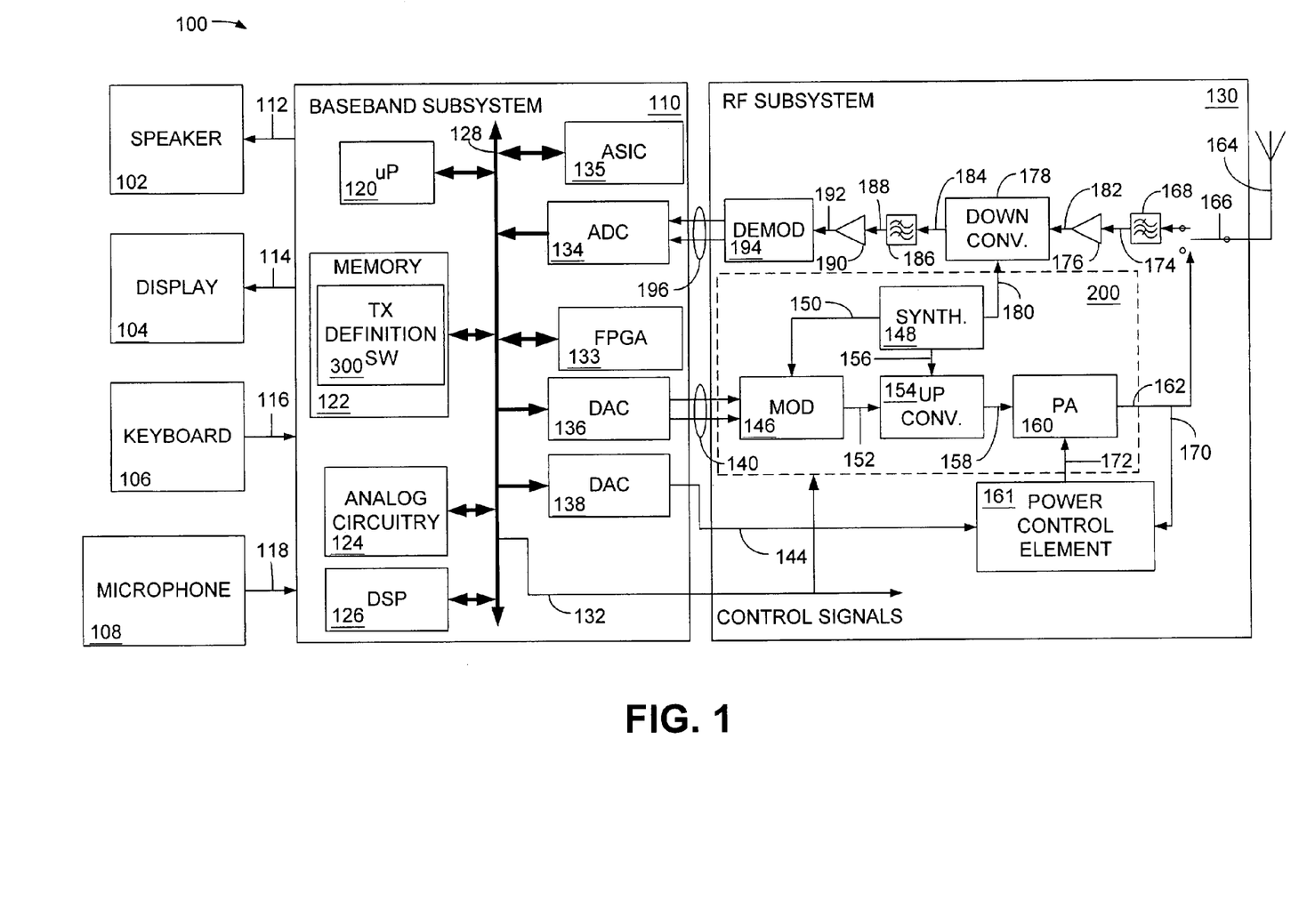
FIG. 1 is a block diagram illustrating a simplified portable transceiver including a software defined transmit architecture.

FIG. 1 is a block diagram illustrating a simplified portable transceiver 100 including a software defined transmit architecture. Portable transceiver 100 includes speaker 102, display 104, keyboard 106, and microphone 108, all connected to baseband subsystem 110. In a particular embodiment, portable transceiver 100 can be, for example but not limited to, a portable telecommunication handset such as a mobile cellular-type telephone. Speaker 102 and display 104 receive signals from baseband subsystem 110 via connections 112 and 114, respectively, as known to those skilled in the art. Similarly, keyboard 106 and microphone 108 supply signals to baseband subsystem 110 via connections 116 and 118, respectively. Baseband subsystem 110 includes microprocessor (μP) 120, memory 122, analog circuitry 124, and digital signal processor (DSP) 126 in communication via bus 128. Bus 128, although shown as a single bus, may be implemented using multiple busses connected as necessary among the subsystems within baseband subsystem 110.

Depending on the manner in which the software defined multiple transmit architecture to be described below is implemented, the baseband subsystem 110 may also include an application specific integrated circuit (ASIC) 135 and a field programmable gate array (FPGA) 133.

Microprocessor 120 and memory 122 provide the signal timing, processing and storage functions for portable transceiver 100. Analog circuitry 124 provides the analog processing functions for the signals within baseband subsystem 110. Baseband subsystem 110 provides control signals to radio frequency (RF) subsystem 130 via connection 132. Although shown as a single connection 132, the control signals may originate from the DSP 126, the ASIC 135, the FPGA 133, or from microprocessor 120, and are supplied to a variety of points within RF subsystem 130. It should be noted that, for simplicity, only the basic components of portable transceiver 100 are illustrated herein. The control signals provided by the baseband subsystem 110 control the various components within the RF subsystem 130, as will be described in detail below.

If the software defined multiple transmit architecture is implemented in software that is executed by the microprocessor 120, the memory 122 will also include the transmit definition software 300, which will be described in detail below. The transmit definition software comprises one or more executable code segments that can be stored in the memory and executed in the microprocessor 120. Alternatively, the functionality of the transmit definition software 300 can be coded into the ASIC or can be executed by the FPGA. Because the memory 122 can be rewritable and because the FPGA is reprogrammable, updates to the transmit definition software 300 can be remotely sent to and saved in the portable transceiver 100 when implemented using either of these methodologies.

Baseband subsystem 110 also includes analog-to-digital converter (ADC) 134 and digital-to-analog converters (DACs) 136 and 138. Although DACs 136 and 138 are illustrated as two separate devices, it is understood that a single digital-to-analog converter may be used that performs the function of DACs 136 and 138. ADC 134, DAC 136 and DAC 138 also communicate with microprocessor 120, memory 122, analog circuitry 124 and DSP 126 via bus 128. DAC 136 converts the digital communication information within baseband subsystem 110 into an analog signal for transmission to RF subsystem 130 via connection 140. DAC 138 provides a reference voltage power level signal to power control element 161 via connection 144. Connection 140, while shown as two directed arrows, includes the information that is to be transmitted by RF subsystem 130 after conversion from the digital domain to the analog domain.

RF subsystem 130 includes modulator 146, which, after receiving a frequency reference signal, also called a "local oscillator" signal, or "LO," from synthesizer 148 via connection 150, modulates the received analog information and provides a modulated signal via connection 152 to upconverter 154. In a constant envelope modulation methodology, the modulated transmit signal generally includes only phase information. Upconverter 154 also receives a frequency reference signal from synthesizer 148 via connection 156. Synthesizer 148 determines the appropriate frequency to which the upconverter 154 upconverts the modulated signal on connection 152.

As will be described in detail below, the synthesizer 148, the modulator 146, the upconverter 154, and the power amplifier 160, along with other components to be described below, form the software defined multiple transmit architecture that is capable of transmitting information that complies with any of a plurality of communication standards. The software defined transmit architecture 200 generally comprises a plurality of selectable components. The selectable components together comprise a plurality of different transmit architectures in which a number of components are shared among the different transmit architectures. The transmit definition software 300 determines which of a number of possible transmit architectures should be enabled, depending on the communication standard being used. The transmit definition software 300 then enables the appropriate components within the software defined transmit architecture 200 to enable communication in the desired standard.

The transmit definition software 300 also determines the proper format for the data to be transmitted. As will be described in greater detail below, the data is generally formatted by the baseband subsystem 110 into in-phase (I) and quadrature (Q) components. The I and Q signals may take different forms and be formatted differently depending upon the communication standard being employed. Because the software defined transmit architecture 200 is capable of multiple transmit methodologies, the transmit definition software 300 is capable of formatting the data to suit each of the available transmit methodologies.

Upconverter 154 supplies the modulated signal via connection 158 to power amplifier 160. Power amplifier 160 amplifies the modulated signal on connection 158 to the appropriate power level for transmission via connection 162 to antenna 164. Illustratively, switch 166 controls whether the amplified signal on connection 162 is transferred to antenna 164 or whether a received signal from antenna 164 is supplied to filter 168. The operation of switch 166 is controlled by a control signal from baseband subsystem 110 via connection 132. Alternatively, the switch 166 may be replaced by a filter pair (e.g., a duplexer) that allows simultaneous passage of both transmit signals and receive signals, as known to those having ordinary skill in the art.

A portion of the amplified transmit signal energy on connection 162 is supplied via connection 170 to power control element 161. Power control element 161 may form a closed power control feedback loop to control the output power of power amplifier 160 and may also supply a power control feedback signal via connection 172.

A signal received by antenna 164 will be directed to receive filter 168. Receive filter 168 will filter the received signal and supply the filtered signal on connection 174 to low noise amplifier (LNA) 176. Receive filter 168 is a band pass filter, which passes all channels of the particular cellular system in which the portable transceiver 100 is operating. As an example, for a 900 MHz GSM system, receive filter 168 would pass all frequencies from 935.1 MHz to 959.9 MHz, covering all 124 contiguous channels of 200 kHz each. The purpose of this filter is to reject all frequencies outside the desired region. LNA 176 amplifies the very weak signal on connection 174 to a level at which downconverter 178 can translate the signal from the transmitted frequency back to a baseband frequency. Alternatively, the functionality of LNA 176 and downconverter 178 can be accomplished using other elements, such as, for example but not limited to, a low noise block downconverter (LNB).

Downconverter 178 receives a frequency reference signal, also called a "local oscillator" signal, or "LO", from synthesizer 148, via connection 180, which signal instructs the downconverter 178 as to the proper frequency to which to downconvert the signal received from LNA 176 via connection 182. The downconverted frequency is called the intermediate frequency or IF. Downconverter 178 sends the downconverted signal via connection 184 to channel filter 186, also called the "IF filter." Channel filter 186 filters the downconverted signal and supplies it via connection 188 to amplifier 190. The channel filter 186 selects the one desired channel and rejects all others. Using the GSM system as an example, only one of the 124 contiguous channels is actually to be received. After all channels are passed by receive filter 168 and downconverted in frequency by downconverter 178, only the one desired channel will appear precisely at the center frequency of channel filter 186.

The synthesizer 148, by controlling the local oscillator frequency supplied on connection 180 to downconverter 178, determines the selected channel. Amplifier 190 amplifies the received signal and supplies the amplified signal via connection 192 to demodulator 194. Demodulator 194 recovers the transmitted analog information and supplies a signal representing this information via connection 196 to ADC 134. ADC 134 converts these analog signals to a digital signal at baseband frequency and transfers the signal via bus 128 to DSP 126 for further processing.

As an alternative, the downconverted carrier frequency (IF frequency) at connection 184 may be 0 Hz, in which case the receiver is referred to as a "direct conversion receiver". In such a case the channel filter 186 is implemented as a low pass filter, and the demodulator 194 may be omitted.

Figure 2:
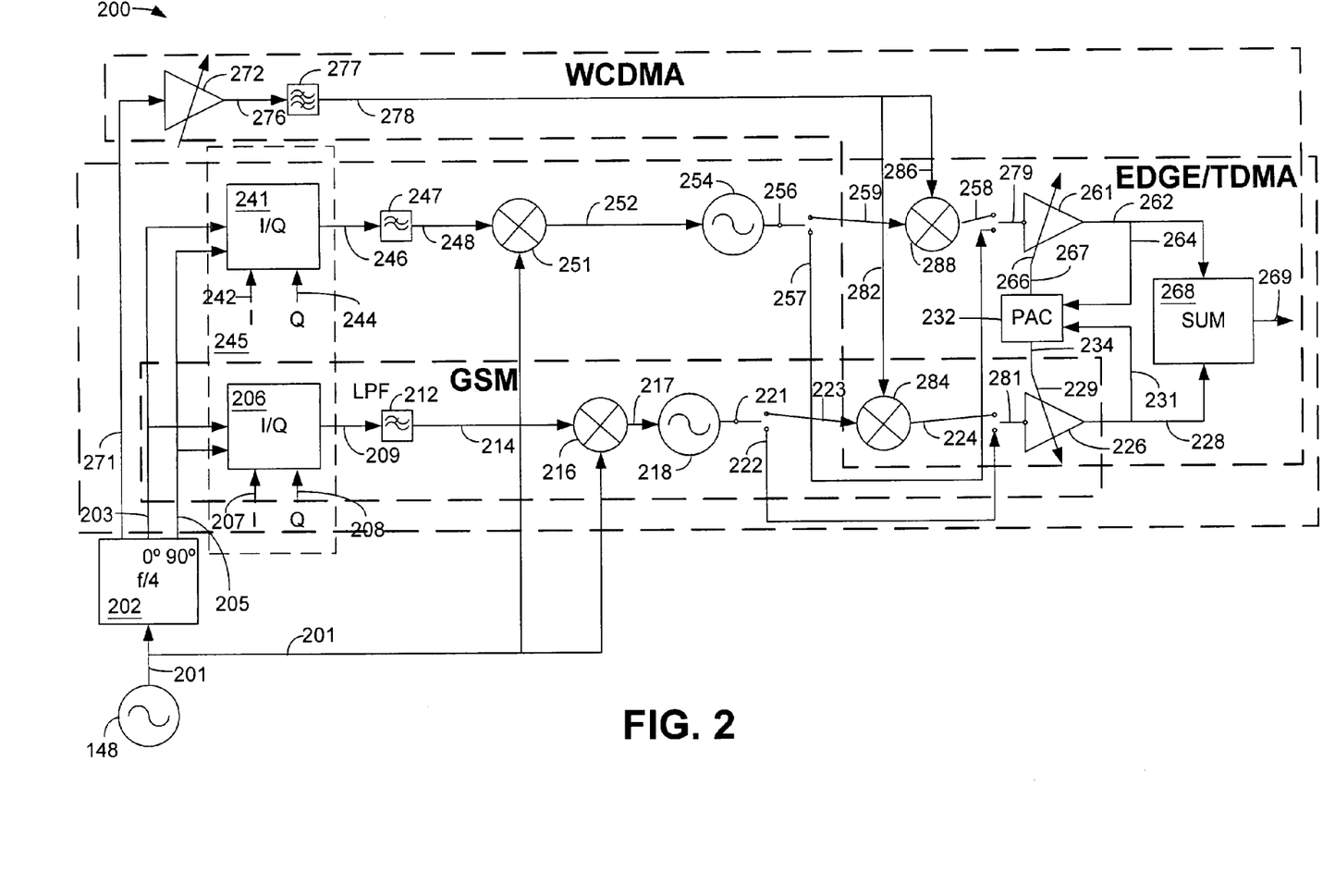
FIG. 2 is a block diagram illustrating the software defined transmit architecture of FIG. 1.

FIG. 2 is a block diagram illustrating the software defined transmit architecture 200 of FIG. 1. The software defined transmit architecture 200 includes a plurality of components, various combinations of which can be used to transmit data in a number of different transmission standards. For example, the software defined transmit architecture 200 includes components that can be selectively enabled by the transmit definition software 300 (FIG. 1) to transmit signals in the GSM, EDGE/TDMA, and the WCDMA standards.

The software defined transmit architecture 200 includes a synthesizer 148 (FIG. 1) that supplies a "local oscillator" (LO) signal via connection 201. Connection 201 is similar to connections 150 and 156 in FIG. 1. The LO signal is supplied to frequency divider 202 and to radio frequency (RF) mixers 216 and 251. The frequency divider 202 divides the input frequency of the synthesizer 148 by a factor of four (4) and provides the divided frequency output on connections 203, 205, and 271. A 0° LO signal is supplied on connection 203, and a 90° LO signal is supplied on connection 205, while the phase of the LO signal supplied over connection 271 is arbitrary. In a simplified embodiment, either connection 203 or connection 205 can be used in place of connection 271. As will be described in greater detail with respect to FIGS. 3, 4, and 5, the software defined transmit architecture 200 can be used to transmit data signals in any of a number of different transmission standards. Accordingly, a transmission standard specific explanation of each of the components in FIG. 2 will be provided in FIGS. 3, 4, and 5, while only a basic description of the components will be provided with regard to FIG. 2.

Although omitted for simplicity, each of the components in the software defined transmit architecture 200 includes a connection to the control signals line 132 of FIG. 1. The control signal line 132 provides a signal, typically generated by the transmit definition software 300, that enables and activates the particular components within the software defined transmit architecture 200, depending on the desired transmission standard.

The exemplary software defined transmit architecture 200 includes components that allow the portable transceiver 100 to communicate using any of the GSM, EDGE/TDMA, and WCDMA transmission standards. Accordingly, either a constant envelope (i.e., one comprising only a PM signal) or a non-constant envelope (i.e., one comprising both a PM signal and an AM signal) output can be provided by the software defined transmit architecture 200. The GSM standard calls for a constant envelope power output. Therefore, as will be described with respect to FIG. 2, only a single transmit chain (i.e., the I/Q modulator 206, low pass filter 212, RF mixer 216, synchronous oscillator 218, and power amplifier 226 form a transmit chain for GSM) may be used for GSM.

However, as will be described below, an EDGE/TDMA transmit signal can be formed by combining the output of the above described transmit chain with the output of the transmit chain formed by the I/Q modulator 241, low pass filter 247, RF mixer 251, synchronous oscillator 254, and power amplifier 261. The output of the two transmit chains can be combined using a technique referred to as "out-phasing." This technique uses the phase difference of two signals that contain only a PM component to develop a signal that includes both a PM component and an AM component, and is described in detail in commonly assigned, co-pending U.S. patent application Ser. No. 10/207,320 entitled "Mirror Translation Loop Transmitter Architecture," filed on Jul. 29, 2002, now U.S. Pat. No. 7,082,169, issued on Jul. 25, 2006, which is hereby incorporated in its entirety by reference.

Alternatively, the two above described transmit chains can also be used for GSM. In such an arrangement, the two chains should always be in phase. The outputs of the two transmit chains are added together to get a higher amplitude output. For example, a 6 dB greater signal and only 3 dB more noise compared to one chain alone. Therefore, in this case the "out-phasing" isn't being used since the two vectors being added always point the same direction.

The software defined transmit architecture 200 includes a phase shifter 245. The phase shifter 245 may comprise any phase shifter, but in this embodiment, comprises a pair of in-phase (I)/quadrature (Q) (I/Q) modulators 206 and 241. The output of the frequency divider 202 on connection 205 is supplied to both the I/Q modulator 206 and the I/Q modulator 241. Depending upon which components are activated by the transmit definition software 300, the data signal that is to be transmitted via the software defined transmit architecture 200 is supplied to one or both I/Q modulators 206 and 241. The data is supplied in the form of an in-phase (I) component and a quadrature (Q) component. For example, when transmitting using the GSM communication standard, the I component is supplied via connection 207 to I/Q modulator 206 and the Q component is supplied via connection 208 to I/Q modulator 206. In the case of EDGE/TDMA (or GSM if the GSM is to combine the output of the two above-defined transmit chains) communication, the I and Q components are also supplied via connections 242 and 244, respectively, to the I/Q modulator 241.

The output of I/Q modulator 206 is supplied via connection 209 to a low-pass filter 212. The low-pass filter 212 rejects any third order and higher harmonics present on the signal on connection 209. The output of the low-pass filter 212 is supplied via connection 214 to the RF mixer 216. The RF mixer 216 receives the local oscillator (LO) signal via connection 201 from the synthesizer 148 and mixes the two signals to upconvert the signal on connection 214 to a radio frequency (RF) signal on connection 217. Unfortunately, the RF mixer 216 has a high noise floor, and therefore, it is possible that undesirable spurious emissions (for example, upconversion byproducts that may be spectrally close to the desired frequency) may be emitted from the RF mixer 216. To reduce the spurious emissions and noise, the output of the RF mixer 216 is supplied to a synchronous oscillator 218.

The synchronous oscillator 218, the detail of which is disclosed in commonly assigned, co-pending U.S. Utility patent application Ser. No. 10/233,231 entitled "Wireless Transmitter Incorporating a Synchronous Oscillator in a Translation Loop," filed on Aug. 30, 2002, now U.S. Pat. No. 6,961,547, issued on Nov. 1, 2005, which is hereby incorporated in its entirety by reference, acts as a regenerative receiver, thereby oscillating at the frequency of the signal on connection 217 and rejecting all spurious emission from mixer 216, thereby providing a clean modulated output signal at the desired RF frequency.

The output of the synchronous oscillator 218 is supplied to a switch 221. The position of the switch 221 determines whether the output of the synchronous oscillator is applied to a mixer (as is the case in WCDMA operation) or directly to a corresponding power amplifier (as is the case in GSM or EDGE/TDMA operation) via another switch 281. The operation of the switches 221 and 281 is controlled by a control signal via connection 132 under the direction of the transmit definition software 300 (FIG. 1). The output of synchronous oscillator 218 is directed by switches 221 and 281 directly to the input of power amplifier 226 via connections 222 and 224. The power amplifier 226 performs the function of the power amplifier 160 of FIG. 1. The signal on connection 224 is amplified by power amplifier 226 and supplied as an output via connection 228.

The output of I/Q modulator 241 is supplied via connection 246 to a low-pass filter 247. The low-pass filter 247 rejects any third order and higher harmonics present on the signal on connection 246 similar to the low-pass filter 212. The output of the low-pass filter 247 is supplied via connection 248 to the RF mixer 251. The RF mixer 251 receives the local oscillator (LO) signal via connection 201 from the synthesizer 148 and mixes the two signals to upconvert the signal on connection 248 to a radio frequency (RF) signal on connection 252 in similar fashion to the RF mixer 216. Similarly, to reduce the spurious emissions on connection 252, the output of the RF mixer 251 is supplied to a synchronous oscillator 254, which operates similarly to the synchronous oscillator 218.

The output of the synchronous oscillator 254 is supplied to a switch 256. The position of the switch 256 determines whether the output of the synchronous oscillator is applied to a mixer (as is the case in WCDMA operation) or directly to a corresponding power amplifier (as is the case in GSM (if both transmit chains are used) or EDGE/TDMA operation) via switch 279. The operation of the switches 256 and 279 is controlled by a control signal via connection 132 under the direction of the transmit definition software 300 (FIG. 1). The output of synchronous oscillator 254 is directed by switches 256 and 279 directly to the input of power amplifier 261 via connections 257 and 258. The power amplifier 261 performs the function of the power amplifier 160 of FIG. 1. The signal on connection 258 is amplified by power amplifier 261 and supplied as an output via connection 262.

If both transmit chains are used, it is possible to form an amplitude modulated (AM) signal using the phase altered phase modulated signals from the I/Q modulators 206 and 241 as described in the above-referenced U.S. patent application entitled "Mirror Translation Loop Transmitter Architecture." These signals are supplied as described above to the RF mixers 216 and 251, and to the synchronous oscillators 218 and 254. However, the signals that are supplied to the two above described transmit chains are constant in magnitude but have opposite phase deltas for EDGE/TDMA, and constant in magnitude but in phase for GSM if the GSM operation uses both transmit chains. These two signals are amplified by the power amplifiers 226 and 261 the output of which are added together in summing element 268. The output of the summing element 268 on connection 269 is the combined output of the two transmit chains. If the two transmit chains have received signals that have opposite phase deltas, then the output on connection 269 can include both a PM component and an AM component. Such a transmit methodology is referred to as "out-phasing" as described above. However, if the two transmit chains have received signals that are in phase, both transmit chains can process a signal having the same phase, which, when combined, provides a signal having an improved signal-to-noise ratio.

For operation in the WCDMA transmission standard, the output of the frequency divider 202 is also supplied via connection 271 to intermediate frequency (IF) variable gain amplifier (VGA) 272. Connection 271 may alternatively be either connection 203 or 205. The IF VGA 272 provides an intermediate frequency non-modulated signal. To satisfy the broad range of amplitude variation of the WCDMA transmit standard, the IF VGA 272 provides a large amount of amplitude range. The IF VGA defines the gain applied to the signal on connection 276. The output of the IF VGA 272 is supplied via connection 276 to the bandpass filter 277. The bandpass filter 277 defines a pass band within which the desired IF signal resides. The output of the bandpass filter 277 is supplied via connection 278 to mixers 284 and 288. The output of the mixer 284 is supplied via connection 224 and switch 281 to amplifier 226 while the output of the mixer 288 is supplied via connection 258 and switch 279 to the amplifier 261. The switches 279 and 281 are controlled by the control signals 132 under the direction of the transmit definition software 300, so that when it is desirable to operate in WCDMA mode, the switches direct the outputs of the mixers 288 and 284 to the power amplifiers 261 and 226, respectively. The operation of the amplifiers 226 and 261 is as described above.

Figure 3:
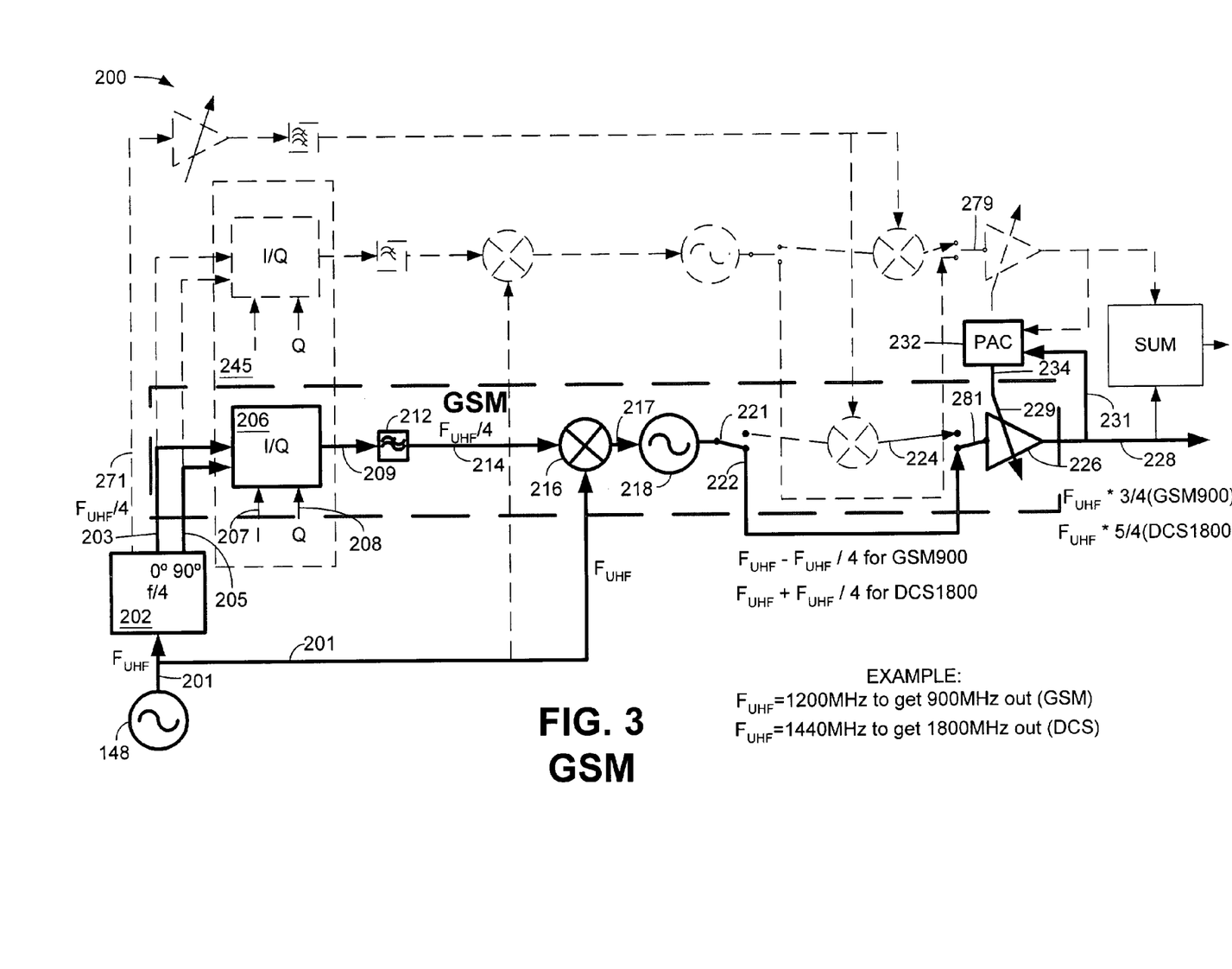
FIG. 3 is a block diagram illustrating the components used when the software defined architecture is operating using the GSM standard.

FIG. 3 is a block diagram illustrating the components used when the software defined transmit architecture 200 is operating using the GSM standard. The components used for GSM are shown in bold while the other components in the software defined transmit architecture 200 are shown in dotted lines, signifying that they are not used. However, the architecture shown in FIG. 4, which describes an embodiment of the invention used for EDGE/TDMA transmission, can also be used for GSM. However, in GSM, the phase of the signals in the two different transmit chains are the same.

Assuming that a single transmit chain is used in FIG. 3, the synthesizer 148 supplies the local oscillator signal to the frequency divider 202 and to the RF mixer 216 via connection 201. The output of the frequency divider 202 is supplied to I/Q modulator 206 via connections 203 and 205. The I and Q signal components supplied via connections 207 and 208 are formatted by the transmit definition software 300 so that they comply with GSM modulation format.

The output of the I/Q modulator is supplied via connection 209 to the low-pass filter 212. The low-pass filter 212 rejects any third order and higher harmonics on connection 209 and supplies a transmit signal on connection 214 to the RF mixer 216. The RF mixer 216 upconverts the signal on connection 214 to an RF signal on connection 217. The RF signal on connection 217 is supplied to the synchronous oscillator 218, which rejects any spurious signals and noise on connection 217 and supplies a clean modulated signal via switch 221, connection 222 and switch 281 to the power amplifier 226. In this embodiment, the switches 221 and 281 are controlled by the transmit definition software 300 to direct the output signal directly from the synchronous oscillator 218 to the power amplifier 226. The power amplifier 226 provides an output signal on connection 228 to an antenna (not shown) of the portable transceiver 100. A portion of the output of power amplifier 226 is directed via connections 231 and 264 to the power amplifier control "PAC" unit 232. The power amplifier control unit 232 is a closed loop power control system which provides a power amplifier control signal on connection 234 to the control input 229 of the power amplifier 226. The output of the power amplifier 226 on connection 228 is the output signal that is directed to the antenna (not shown) of the portable transceiver 100.

Figure 4:
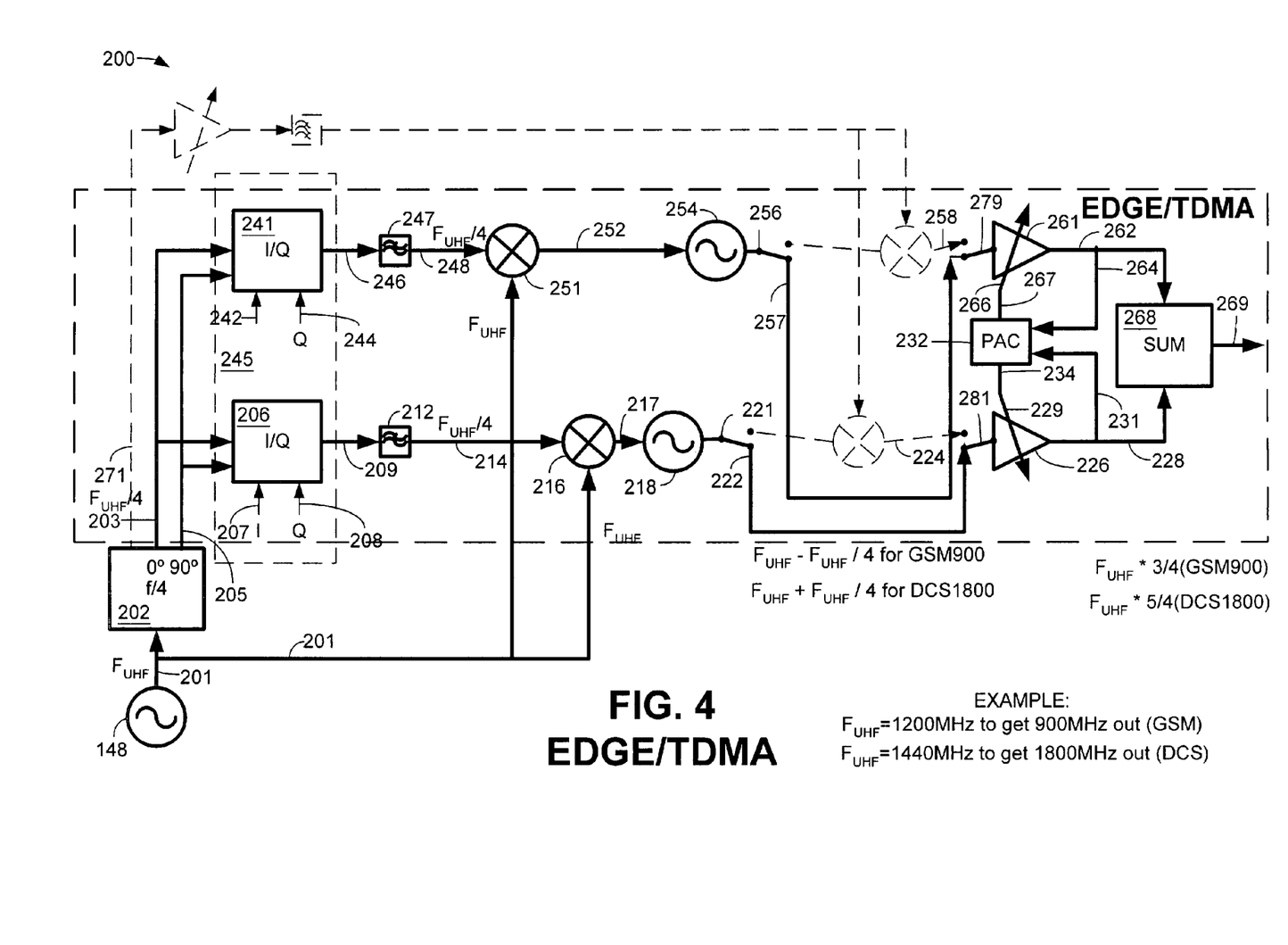
FIG. 4 is a block diagram illustrating the components used when the software defined transmit architecture is operating using the EDGE/TDMA standard.

FIG. 4 is a block diagram illustrating the components used when the software defined transmit architecture 200 is operating using the EDGE/TDMA standard. The output of the frequency divider 202 is supplied via connections 203 and 205 to both I/Q modulator 206 and I/Q modulator 241. Each modulator receives both 0° and 90° components of the output of the frequency divider 202. Because EDGE/TDMA modulation includes both a PM component and an AM component, the above mentioned "out-phasing" technique is employed as described in the above-mentioned commonly assigned co-pending U.S. patent application entitled "Mirror Translation Loop Transmitter Architecture," to provide both a phase modulated component and an amplitude modulated component in a non-constant envelope transmission format.

The signal output from the I/Q modulator 206 on connection 209 differs in phase from the signal output from the I/Q modulator 241 on connection 246, as determined by the opposite phase delta components applied to each modulator, as described in the above mentioned commonly assigned co-pending U.S. patent application entitled. "Mirror Translation Loop Transmitter Architecture." These signals are supplied to respective low-pass filters 212 and 247. The outputs of the low-pass filters 212 and 247 are supplied to respective RF mixers 216 and 251. The output of the RF mixer 216 is supplied via connection 217 to synchronous oscillator 218 and the output of the RF mixer 251 is supplied via connection 252 to the synchronous oscillator 254. The synchronous oscillators 218 and 254 reject any spurious signals and noise on connections 217 and 252, respectively, and supply their respective outputs to respective switches 221 and 256.

The transmit definition software 300 controls the switches 221 and 256 so that the output of the synchronous oscillator 218 is directed, via connection 222 and switch 281, to the power amplifier 226, and so that the output of the synchronous oscillator 254 is directed, via connection 257 and switch 279, to the power amplifier 261. In this embodiment, the combination of the two power amplifiers 226 and 261 collectively comprise the power amplifier 160 of FIG. 1. The output of power amplifier 226 is directed via connection 228 to the summing element 268 while the output of the power amplifier 261 is directed via connection 262 to the summing element 268. A portion of the output of each power amplifier 226 and 261 is also directed via connection 231 and connection 264 as input to the power amplifier control element 232. The power amplifier control element 232 provides power amplifier control signals on connections 234 and 267 to the respective control inputs 229 and 266 of power amplifiers 226 and 261.

The summing element 268 combines the output of each power amplifier and provides a combined signal on connection 269. The combined signal on connection 269 includes both a PM component and an AM component and is directed to the antenna (not shown) of the portable transceiver 100.

Figure 5:
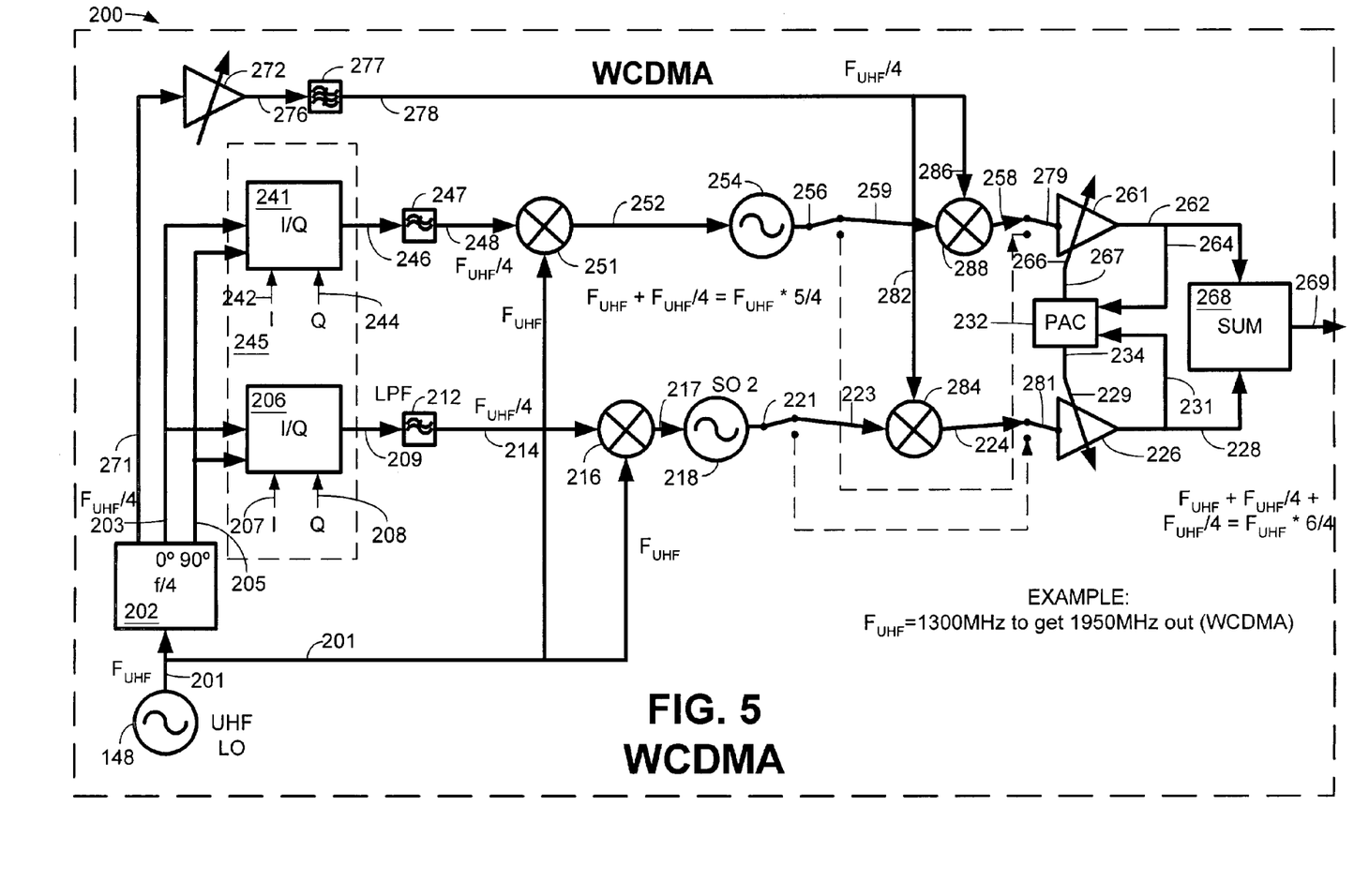
FIG. 5 is a block diagram illustrating the components used when the software defined transmit architecture is operating using the WCDMA standard.

FIG. 5 is a block diagram illustrating the components used when the software defined transmit architecture 200 is operating using the WCDMA standard. When used in WCDMA mode, all components of the software defined transmit architecture 200 are enabled. In addition to connections 203 and 205, the output of the frequency divider 202 is directed via connection 271 to the IF VGA 272. As mentioned above, the signal on connection 271 may be replaced by either the signal on connections 203 or 205. As described above, the IF VGA 272 provides an intermediate frequency non-modulated signal having a large amount of amplitude range on connection 276 to the bandpass filter 277. The bandpass filter 277 passes signals in the desired frequency band onto connection 278. The connection 278 directs the output of the bandpass filter 277 onto connections 282 and 286 to mixers 284 and 288, respectively. The transmit definition software 300 causes the switches 221 and 256 to reposition so that the output of the synchronous oscillator 218 is directed onto connection 223 and the output of synchronous oscillator 254 is directed onto connection 259. The connection 223 directs the output of the synchronous oscillator 218 to the mixer 284 while the connection 259 directs the output of the synchronous oscillator 254 to the mixer 288.

For GSM and EDGE/TDMA, the outputs of synchronous oscillators 254 and 218 are at the transmit frequency. However, for WCDMA the outputs need one more mix to increase the frequency by an amount $F_{UHF}/4$ to get to the transmit frequency. Note that the WCDMA transmit frequency is a little higher than DCS1800/PCS1900. This is illustrated using the frequency plans in FIGS. 3, 4 and 5. Note however, that this WCDMA frequency difference is not the only reason to include the mixers 288 and 284. The mixers 288 and 284 provide a large range of amplitude control, by mixing the fixed-amplitude signal on connections 259 and 223 with a variable-amplitude signal provided by the IF VGA 272. The "variable amplitude" refers to the average power level to be transmitted. The gain of the IF VGA 272 is set according to the output power desired at the output 269 when operating in WCDMA mode.

To illustrate, the gain of the power amplifier can be varied by about 50 dB, which is sufficient for the GSM and EDGE/TDMA systems, but the WCDMA system typically uses 90 dB of range. Therefore, the amplitude of the IF signal is varied by approximately 40 dB by the IF VGA 272. The IF signal is then mixed in mixers 284 and 288 with the output of the synchronous oscillators 218 and 254, respectively, before supplying these signals to the power amplifiers 226 and 261.

The mixer 284 combines the low noise RF output of the synchronous oscillator 218 with the output of the bandpass filter 277 on connection 282 and the mixer 288 combines the low noise RF output of the synchronous oscillator 254 with the output of the bandpass filter 277 on connection 286.

The transmit definition software 300 also causes the switches 281 and 279 to reposition so that the output of the mixer 284 is supplied via connection 224 to the power amplifier 226 and the output of the mixer 288 is supplied via connection 258 to the power amplifier 261. The operation of the power amplifiers 226 and 261 is as described above. It should be noted that for the mixers 284 and 288 to operate properly and provide a low-noise output, the mixer ports should be properly chosen. Each mixer has a "LO" input port and a "small signal" input port. The LO port of mixer 288 is input 259, and the LO port of mixer 284 is input 223. The "small signal" port of mixer 288 is input 286, and the "small signal" port of mixer 284 is input 282. This is because a synchronous oscillator provides a relatively large constant amplitude signal which is suitable as the LO to the mixer, while the IF VGA 272 provides a variable amplitude signal, which is intended to affect the mixer output amplitude in a proportional fashion.

The transmit definition software 300 formats the I and Q signal components depending upon the selected transmit standard. Accordingly the I and Q components will assume different formats depending upon the selected transmit standard. For example, the I and Q signal components will have a different format for GSM, EDGE/TDMA and WCDMA and will also have a different format depending on whether a constant envelope power output or a non-constant envelope power output is provided.

As described herein, the software defined transmit architecture 200 extensively reuses existing hardware to support various digital cellular formats. The software defined transmit architecture 200 allows the implementation of the transmit section of a portable transceiver on a single module to achieve high performance at low cost, using a minimal number of components, and using a minimal amount of board space. Utilization of the generally non-linear components described in FIGS. 2 through 5 to form a near-linear output signal allows the software defined transmit architecture 200 to achieve a significant increase in power efficiency compared to existing transmit architectures when used in WCDMA mode. Importantly, the software defined transmit architecture 200 requires no external surface acoustic wave (SAW) or other filters to support multi-standard, multi-band operation. For operation using the WCDMA standard, the wide dynamic range is achieved without placing any severe linearity requirements on the IF VGA 272, since the IF VGA 272 amplifies only a non-modulated carrier signal.

Figure 6:
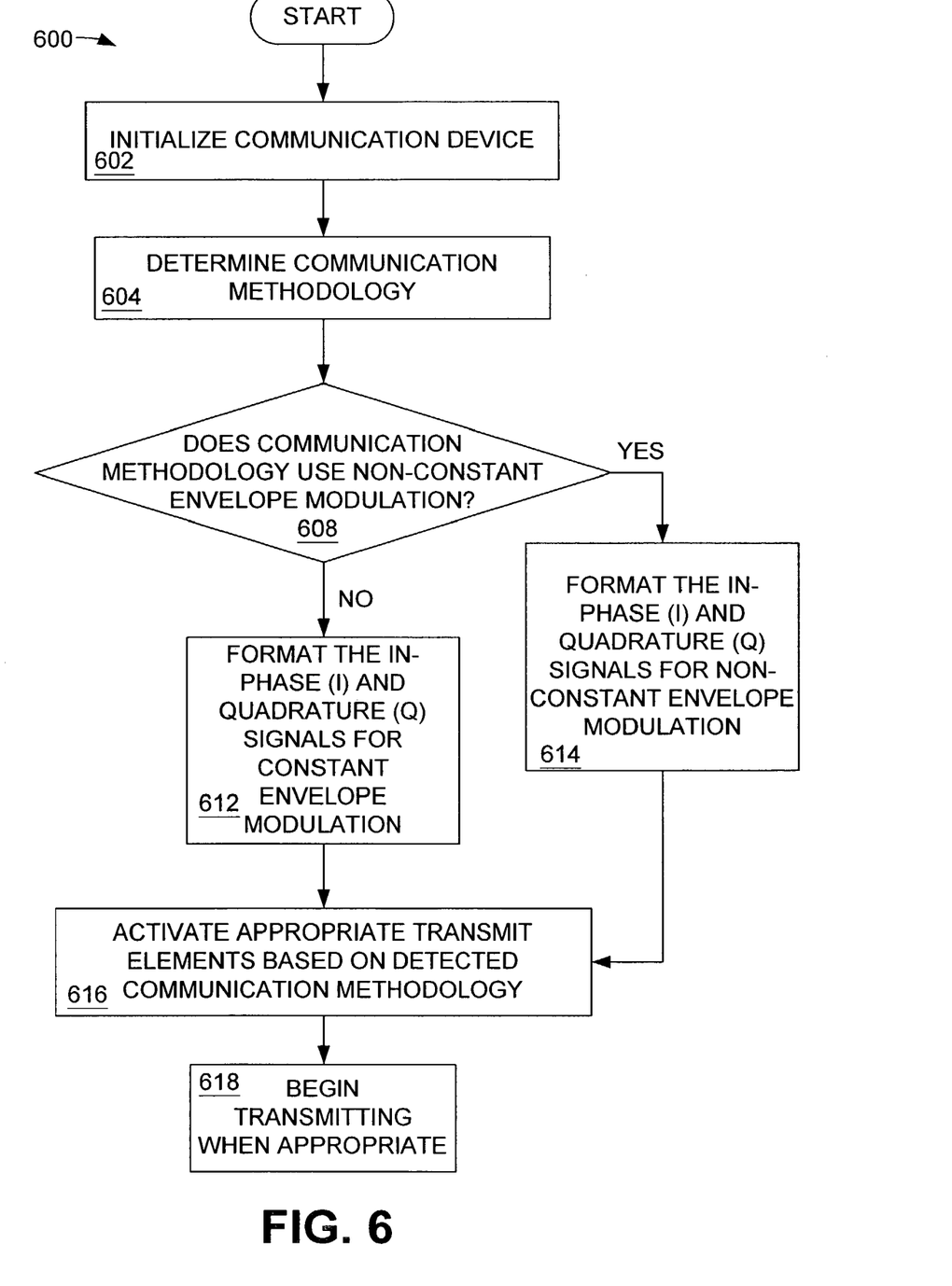
FIG. 6 is a flow chart describing the operation of the transmit definition software of FIG. 1.

FIG. 6 is a flow chart 600 describing the operation of the transmit definition software 300 of FIG. 1. In block 602 the portable transceiver 100 is initialized. In block 604, the transmit definition software 300 determines the communication standard under which communication will occur. This can be accomplished by, for example, receiving and decoding a signal from a base station with which the portable transceiver 100 is communicating. During the initialization sequence, the portable transceiver 100 can activate and listen for signals from nearby base stations. The signal received from the base station can include information that determines the transmission standard with which the base station wishes to communicate with the portable transceiver 100.

Alternatively, a user of the portable transceiver 100 can determine the communication standard through interaction with a control input (for example, the keyboard 106 of FIG. 1) associated with the portable transceiver 100.

In block 606 the transmit definition software 300 determines whether the communication standard uses a constant or a non-constant envelope modulation format. If it is determined that a constant envelope modulation format is used, then, in block 612, the I and Q signals are formatted for the constant envelope modulation format. If it is determined that a non-constant envelope modulation format is used, then, in block 614, the I and Q signals are formatted for the non-constant envelope modulation format.

In block 616, after the transmission standard has been determined and the I and Q signals have been formatted appropriately, the transmit definition software 300 activates the appropriate components within the software defined transmit architecture 200 based upon the determined communication standard. For example, if the portable transceiver 100 is to communicate using the GSM standard, then, the components shown in FIG. 3 would be activated by the transmit definition software 300, using a control signal sent via connection 132 from the baseband subsystem 110 to the RF subsystem 130. Depending upon the manner in which the system is implemented, the control signals 132 may originate in the DSP 126, in the ASIC 135, or from the FPGA 133.

In block 618 the transmit definition software 300 begins transmitting using the appropriate selected components.

While various embodiments of the invention have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A method for operating a multiple standard transmitter, comprising:

providing a transmitter including a plurality of digital, multiple band use, software selectable components arranged in a plurality of transmit chains, the plurality of transmit chains including a modulator, a filter, a mixer, and a synchronous oscillator coupled in series, the plurality of digital, multiple band use, software selectable components comprising a plurality of transmit architectures in which at least one component can be used in each of the plurality of transmit architectures, wherein respective output signals from first and second transmit chains that contain only a phase modulated component are used to develop a signal that includes an amplitude modulated component; and enabling one of the plurality of transmit architectures to transmit a communication signal.

2. The method of claim 1, wherein one of the plurality of transmit architectures is a GSM transmit architecture.

3. The method of claim 1, wherein one of the plurality of transmit architectures is a WCDMA transmit architecture.

4. The method of claim 1, wherein one of the plurality of transmit architectures is an EDGE/TDMA transmit architecture.

5. The method of claim 1, wherein one of the plurality of transmit architectures is enabled based on an input signal.

6. The method of claim 5, further comprising supplying the input signal to the multiple standard transmitter from an input device associated with the multiple standard transmitter.

7. The method of claim 5, further comprising supplying the input signal to the multiple standard transmitter from a source external to the multiple standard transmitter.

8. A multiple standard transmitter, comprising:

a transmitter including a plurality of digital, multiple band use, software selectable components arranged in a plurality of transmit chains, the plurality of transmit chains including a modulator, a filter, a mixer, and a synchronous oscillator coupled in series, the plurality of digital, multiple band use, software selectable components comprising a plurality of transmit architectures in which at least one component can be used in each of the plurality of transmit architectures, wherein respective output signals from first and second transmit chains that contain only a phase modulated component are used to develop a signal that includes an amplitude modulated component; and a software code segment configured to enable one of the plurality of transmit architectures to transmit a communication signal.

9. The multiple standard transmitter of claim 8, wherein one of the plurality of transmit architectures is a GSM transmit architecture.

10. The multiple standard transmitter of claim 8, wherein one of the plurality of transmit architectures is a WCDMA transmit architecture.

11. The multiple standard transmitter of claim 8, wherein one of the plurality of transmit architectures is an EDGE/TDMA transmit architecture.

12. The multiple standard transmitter of claim 8, wherein the software code segment enables one of the plurality of transmit architectures based on an input signal.

13. The multiple standard transmitter of claim 12, wherein the input signal is supplied by a user of the multiple standard transmitter.

14. The multiple standard transmitter of claim 12, wherein the input signal is received from a source external to the multiple standard transmitter.

15. A portable transceiver that can transmit data complying with multiple communication standards, comprising:
   a modulator configured to receive and modulate a data signal;
   an upconverter configured to receive the modulated data signal and provide a radio frequency (RF) signal;
   a transmitter including a plurality of digital, multiple band use, software selectable components arranged in a plurality of transmit chains, the plurality of transmit chains including a modulator, a filter, a mixer, and a synchronous oscillator coupled in series, the plurality of digital, multiple band use, software selectable components comprising a plurality of transmit architectures in which at least one component can be used in each of the plurality of transmit architectures, wherein respective output signals from first and second transmit chains that contain only a phase modulated component are used to develop a signal that includes an amplitude modulated component; and
   logic configured to enable one of the plurality of transmit architectures to transmit the RF signal.

16. The system of claim 15, further comprising logic configured to format the data signal supplied to the modulator into in-phase (I) and quadrature (Q) components that correspond to the enabled transmit architecture.

17. A multiple standard transmitter, comprising:
   transmitter means including a plurality of digital, multiple band use, software selectable components arranged in a plurality of transmit chains, the plurality of transmit chains including a modulator, a filter, a mixer, and a synchronous oscillator coupled in series, the plurality of digital, multiple band use, software selectable components comprising a plurality of transmit architectures in which at least one component can be used in each of the plurality of transmit architectures, wherein respective output signals from first and second transmit chains that contain only a phase modulated component are used to develop a signal that includes an amplitude modulated component; and
   means for enabling one of the plurality of transmit architectures to transmit a communication signal.

18. The system of claim 17, further comprising means for formatting a data signal into in-phase (I) and quadrature (Q) components.

* * * * *